Patented Jan. 1, 1929.

1,697,267

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

METHOD OF OXIDATION.

No Drawing.   Application filed March 22, 1919.   Serial No. 284,372.

This invention relates to a method of oxidizing hydrocarbons and particularly those derived by the cracking of heavy oils such as petroleum oil and also those derived by the cracking of asphalt, gilsonite, fats, greases and the like. While the invention has many modifications and the sources of raw material are varied the process will be illustrated by the employment of a mixture of gases and vapors such as oil gas obtained in the cracking of petroleum oil.

For this purpose heavy petroleum oil may be dropped into a heated pan and allowed to become gasified, the gases and vapors being passed through an elongated highly heated retort or tube so as to yield a high percentage of unsaturated bodies ranging say from 25 to 45% or thereabouts. These gases may then be carried through a hydraulic seal and tars etc. removed. If desired they may be passed through scrubbers or compressors to remove heavier constituents. Further they may be dried or washed to remove sulphur compounds or to remove any other undesirable constituents. Such gases containing a high percentage of propylene and butylene and analogous lower olefines are mixed with air and introduced into a catalytic chamber where the mixture is brought into contact with a catalyzer such as a spiral of copper gauze, or brass, iron or other suitable catalytic material in the form of the metal as for example, pieces of wire gauze or fragments of compounds such as copper or chromium oxide, iron vanadate, silver chromate etc. Catalyzers of this character may be supported on any suitable carrier if desired.

For example a mixture of oil gas containing about 40 per cent of olefines is admixed with air in quantity somewhat in excess of that required to suitably oxidize the olefines to partial or intermediate oxidation products such as fatty acids or aldehydes and the mixture is passed over a spiral of copper gauze which is maintained at a temperature just below a low red heat. The products issuing from the catalytic chamber are passed into a suitable absorbing agent for water-soluble substances and fatty acids may be collected if desired in an alkaline absorbing agent. The maintenance of the catalyst at just below a red heat is of importance, since if the temperature is allowed to rise substantially higher, there would be produced great losses of the material operated upon, such material being largely converted into carbon dioxid and water.

The residual gases if sufficiently rich in combustible material may be employed as a fuel. Preferably the catalytic chamber is arranged to regenerate the heat, that is to say the incoming air and vapors may be passed about the catalytic chamber in such a manner as to cool the latter so that an excessive temperature is not developed which would destroy the products of selective oxidation. The reaction also may be controlled to some extent by the addition of steam or an inert gas to dilute the mixture of oil gas and air entering the catalytic chamber.

In controllably oxidizing a gas so rich in olefines as oil gas produced in accordance with the present procedure so as to form oxygen containing aliphatic compounds, it is important to control the temperature within narrow limits and a pyrometer may be placed in the catalytic mass to regulate the temperature and a thermostatic device may be employed to admit more or less steam so that the temperature of the catalyzer which responds very quickly to the effects of steam may be automatically adjusted and maintained.

The process is especially applicable to gases containing over 20% of olefine material.

The effect of the cracking operation is to reduce the heavy petroleum oil, tars or residues of various sorts at a very high temperature to gases, which are largely fixed and which contain more or less of unsaturated material especially olefines. It is also within the scope of the invention to purify the gases and vapors so obtained so they will not affect the catalytic material employed. Some catalyzers are affected by sulphur which is sometimes an undesirably large component of the oil gas. This may be largely removed by lime and iron hydrate treatment. Of course when a catalyzer is employed which is not sensitive to sulphur or other impurities the purification step may be eliminated. In the catalytic stage it is essential to control the temperature within the reacting limits while preferably securing a maximum degree of conversion and the use of regenerative means especially coupled with the introduction of an internal cooling agent such as steam enables this stage of operation to be effectuated.

An important example of the use of the process is the oxidation of still gases obtained in the cracking of petroleum oil. These gases contain, as above stated, some percentage of olefines and constitute a cheap source of starting material for the process.

The procedure above-described is capable of producing not only fatty acids but also other intermediate oxidation products, including aldehydes.

What I claim is:—

1. The process of making oxygenated aliphatic bodies which comprises passing gas from cracking petroleum into contact with a heated catalyzer maintained at just below dull redness and in the presence of an oxygen-containing gas, the mixture containing substantially more than one atom of oxygen to each molecule of readily oxidizable constituents in said gas, to effect selective oxidation.

2. A process of making oxidized aliphatic organic compounds which comprises mixing oil gas containing at least 20% of olefines with air in amount somewhat in excess of one atom of oxygen for each molecule of olefine in the gas, and passing the resulting mixture into contact with a catalyzer maintained at a temperature below a low red heat.

3. A process of making oxidized products from oil gas which comprises mixing ready formed oil gas containing unsaturated constituents, with air, the latter being in some excess over the ratio of one atom of oxygen to one molecule of unsaturated hydrocarbon, and passing the mixture into contact with a heated catalyzer capable of effecting the formation of incompletely oxidized bodies from such oil gas such catalyzer being maintained at somewhat below a dull red heat.

4. A process of making oxidized products from oil gas which comprises subjecting hydrocarbon gas of the aliphatic series substantially free from catalyzer poisons and containing unsaturated hydrocarbons, with an oxygen-containing gas containing substantially more than one atom of oxygen for each molecule of unsaturated hydrocarbon in said hydrocarbon gas to the action of a catalyzer capable of producing incomplete oxidation of the constituents of such oil gas, at a temperature maintained below a red heat, and preventing the temperature from increasing to a degree corresponding to a red heat.

5. A process of making oxygenated products which comprises mixing an oil gas containing at least about 20% of olefines, with an amount of oxygen containing gas slightly in excess of the ratio of one molecule of olefine to one atom of oxygen, and passing the mixture over a catalyzer maintained at just below a dull red heat, while preventing the temperature of the catalyst from reaching a red heat.

6. In the treatment of a liquid mineral hydrocarbon containing hydrocarbons of different molecular weights, the steps consisting of subjecting the same to heat treatment, at least sufficient to convert a part thereof into vapor or gaseous phase, then separating from heavier portions thereof, a lighter portion in the vapor or gaseous phase, and thereafter mixing a lighter portion while still in the vapor or gaseous phase, with oxygen and partially oxidizing the same at a temperature below that of self-sustained combustion and in a range which produces partial oxidation products.

CARLETON ELLIS.